(12) United States Patent
Angen et al.

(10) Patent No.: US 12,522,015 B2
(45) Date of Patent: Jan. 13, 2026

(54) TILE TOOL

(71) Applicant: Crowne Tools LLC, New Orleans, LA (US)

(72) Inventors: Kurt Angen, San Jose, CA (US); Andrew Eylander, Carlsbad, CA (US)

(73) Assignees: Crowne Tools LLC, New Orleans, LA (US); Crowne Tools LLC, New Orleans, LA (US)

( * ) Notice: Subject to any disclaimer, the term of this patent is extended or adjusted under 35 U.S.C. 154(b) by 396 days.

(21) Appl. No.: 18/123,781

(22) Filed: Mar. 20, 2023

(65) Prior Publication Data

US 2023/0311560 A1    Oct. 5, 2023

Related U.S. Application Data

(60) Provisional application No. 63/325,084, filed on Mar. 29, 2022.

(51) Int. Cl.
*B43L 7/027* (2006.01)
*B28D 7/00* (2006.01)

(52) U.S. Cl.
CPC .............. *B43L 7/0275* (2013.01); *B28D 7/00* (2013.01)

(58) Field of Classification Search
CPC ................................ B43L 7/0275; B28D 7/00
USPC .............................................. 33/429; 83/821
See application file for complete search history.

(56) References Cited

U.S. PATENT DOCUMENTS

| | | | | |
|---|---|---|---|---|
| 1,101,119 A | * | 6/1914 | Classon | B43L 7/0275 33/474 |
| 5,727,325 A | * | 3/1998 | Mussell | B43L 7/027 33/476 |
| 5,813,126 A | * | 9/1998 | Dahl | B25H 1/0078 33/42 |
| 5,813,306 A | * | 9/1998 | Jacoff | B27G 5/026 83/762 |
| 6,508,244 B2 | * | 1/2003 | Lee | B23D 47/025 83/435.11 |
| 7,350,517 B2 | * | 4/2008 | Perez | B25H 7/02 125/35 |
| 8,656,902 B2 | * | 2/2014 | Wei | B28D 7/04 125/35 |
| 11,230,138 B2 | * | 1/2022 | Meahl | E04F 21/0076 |
| 2003/0136241 A1 | * | 7/2003 | Schonfelder | B23Q 9/0078 83/477.2 |
| 2023/0311560 A1 | * | 10/2023 | Angen | B43L 7/0275 33/429 |

OTHER PUBLICATIONS

QEP, TileTrim Square—Square for Cutting Tile Edging Trim and Jolly on Wet Saws and Chop Saws, 2023, The Home Depot (Year: 2023).*

* cited by examiner

*Primary Examiner* — Peter J Macchiarolo
*Assistant Examiner* — Anna Josephine Saunders
(74) *Attorney, Agent, or Firm* — Fargo Patent & Business Law; Thomas Kading

(57) ABSTRACT

A system, method, and apparatus for conveniently and accurately cutting material such as trim, tile, profiles, Schluter trim, or other such non-flat material which are difficult to hold steady, comprises a tool body, the tool body configured to have an adjacent side, an opposite side, and a hypotenuse, a hypotenuse slit formed in the tool body, a second slit formed in the tool body, and an indentation in the tool body.

29 Claims, 11 Drawing Sheets

TILE TOOL

CROSS REFERENCE TO RELATED PATENT APPLICATIONS

This patent application claims the priority and benefit under 35 U.S.C. § 119(e) of U.S. Provisional Patent Application Ser. No. 63/325,084 filed Mar. 29, 2022, entitled "TILE TOOL." U.S. Provisional Patent Application Ser. No. 63/325,084 is herein incorporated by reference in its entirety.

TECHNICAL FIELD

Embodiments are generally related to the field of construction. Embodiments are also related to the field of tools. Embodiments are further related to the field of tools for construction. Embodiments are further related to tools for saws or other cutting devices. Embodiments are further related to tools for cutting tile.

BACKGROUND

Many construction projects require numerous measurements, cuts, and angles that must be accurate. A common tool for such applications is a speed square. A speed square is generally configured as a triangle where one of the corners is a perfect 90 degree angle. The sides of tool can include a pivot point and marks for measuring lengths or angles. This makes it very easy to make perpendicular lines, or lines at a desired angle.

While speed squares are useful for these purposes, in a wet environment it can be difficult to keep the speed square at its desired position. This compromises the accuracy of the cuts or lines made with the tool.

While wet conditions are possible in numerous settings, one particularly common application is that of a wet saw used to cut tile. Those skilled at tile cutting will appreciate that a speed square is both useful for wet saw applications but is also very difficult to securely engage with the wet saw, particularly without additional clamps of vices.

This becomes particularly challenging when dealing with materials that aren't flat. An example of a difficult material to accurately cut is quarter round tile. Current tools are either inconvenient or poorly suited for marking or cutting quarter round tile. Other shaped materials such as trim, accent tile, schluter trim, or other such non-flat material are also difficult to hold steady and cut using standard cutting tools. For example, cutting metal jollys such as Schluter trim can be difficult on a wet saw because the saw's table has a fence on the back that doesn't allow the trim to sit flat on the table.

As such, there is a need in the art for simple, cost effective systems, methods, and tools for making accurate cuts or drawing accurate lines on quarter round tile, as disclosed herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a tool.

It is another aspect of the disclosed embodiments to provide a tiling tool.

It is another aspect of the disclosed embodiment to provide a tool for holding work pieces of unusual shape or configuration such as quarter round tile or schlueter.

It is another aspect of the disclosed embodiments to provide a method and system or apparatus for making straight cuts.

It is another aspect of the disclosed embodiments to provide a method and system or apparatus for making straight lines.

It is another aspect of the disclosed embodiments to provide methods, systems, and apparatuses for a squaring tool which can be quickly and easily engaged with a cutting tool such as a wet saw.

In an exemplary embodiment a tool comprises a tool body, the tool body configured to have an adjacent side, an opposite side, and a hypotenuse, a hypotenuse slit formed in the tool body, a second slit formed in the tool body, and an indentation in the tool body. In an embodiment, the indentation comprises a downward sloping surface on a top surface of the tool body and an adjacent upward sloping surface on the top surface of the tool body. In an embodiment, the tool further comprises a rectangular sloping surface in a bottom surface of the tool body. In an embodiment, the tool further comprises a pass through in the tool body. In an embodiment, the tool body comprises a right triangle. In an embodiment, the hypotenuse slit further comprises a slit along the hypotenuse of the tool body between the opposite side of the tool body and the adjacent side of the tool body. In an embodiment, the second slit further comprises a slit along the top surface of the tool body between the opposite side of the tool body and the adjacent side of the tool body. In an embodiment, the hypotenuse slit is in a perpendicular plane to that of the second slit. In an embodiment, the tool further comprises the second slit is parallel to the indentation in the tool body. In an embodiment, the tool body is configured to engage a work piece to be cut with a wet saw.

In another embodiment a system comprises a tool body, the tool body comprising a right triangle configured to have an adjacent side, an opposite side, and a hypotenuse, a hypotenuse slit formed in the hypotenuse of the tool body, a second slit formed in the top surface of the tool body, and an indentation in the tool body. In an embodiment, the indentation comprises a downward sloping surface on a top surface of the tool body and an adjacent upward sloping surface on the top surface of the tool body. In an embodiment, the system further comprises a pass through in the tool body. In an embodiment, the system further comprises a chamber formed in a first section of the hypotenuse. In an embodiment, the hypotenuse slit further comprises a slit along the hypotenuse of the tool body between the opposite side of the tool body and the adjacent side of the tool body, and at least one perpendicular slit formed in a first section, or a second section separated by the hypotenuse slit. In an embodiment, the second slit further comprises a slit along the top surface of the tool body between the opposite side of the tool body and the adjacent side of the tool body and at least one perpendicular slit formed in the tool body along the second slit. In an embodiment, the tool body is configured to engage a work piece to be cut with a saw. In an embodiment, the system further comprises a clamp configured to engage to the tool body and the saw.

In an embodiment a tool comprises a tool body, the tool body comprising a right triangle configured to have an adjacent side, an opposite side, and a hypotenuse, a hypotenuse slit formed in the tool body, a second slit formed in the tool body, an indentation in the tool body, and a pass through in the tool body. In an embodiment, the system further comprises a plurality of markings configured at equal intervals along the second slit.

The aforementioned aspects and other objectives and advantages can now be achieved as described herein.

BRIEF DESCRIPTION OF THE FIGURES

The accompanying figures, in which like reference numerals refer to identical or functionally similar elements throughout the separate views and which are incorporated in, and form a part of the specification, further illustrate the embodiments and, together with the detailed description, serve to explain the embodiments disclosed herein.

DETAILED DESCRIPTION

Figure 1:
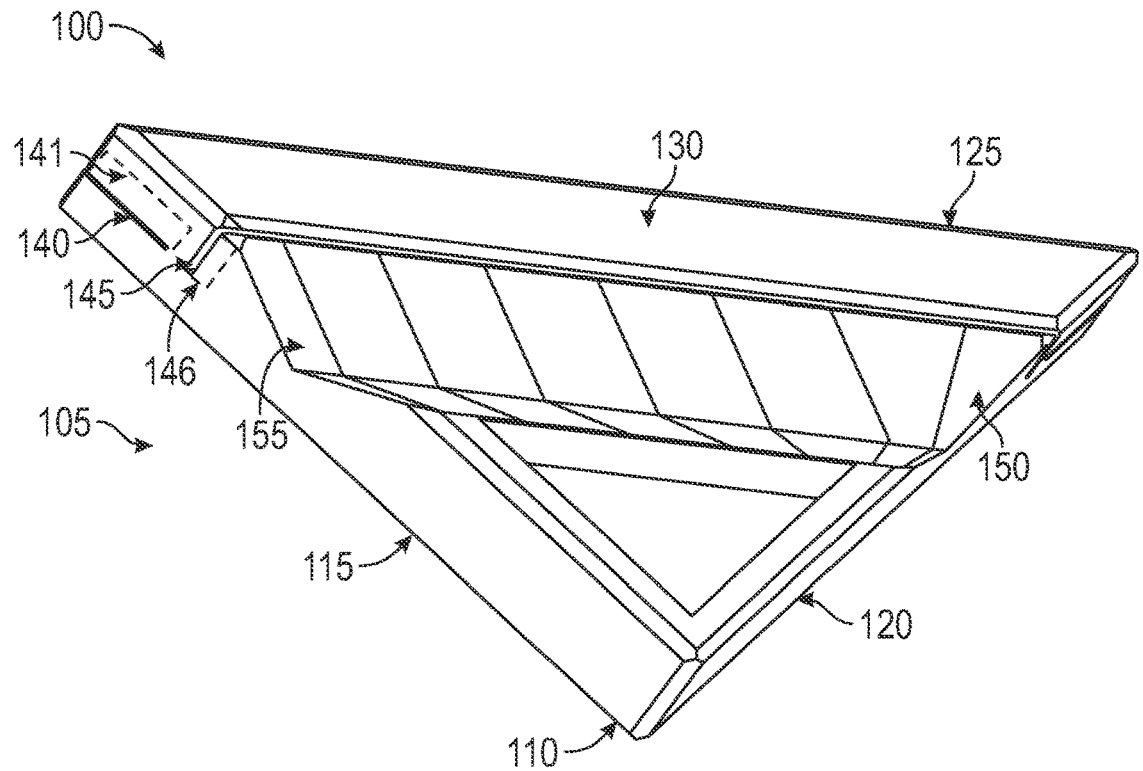
FIG. 1 depicts a squaring tool, in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context. All aspects of the various embodiments can be interchangeable with aspects disclosed in other embodiments, and/or can be incorporated in other embodiments.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope and concept of the invention as defined by the appended claims.

FIG. 1 illustrates a squaring tool 100 in accordance with the disclosed embodiments. The squaring tool 100 generally comprises a body 105 configured as a right triangle, where right corner 110 of the triangle body 105 is a perfect 90 degrees. The squaring tool 100 thus includes a tool body 105 with an opposite side 115, adjacent side 120, and a hypotenuse side 125. The tool body 105 can be configured to have a desired thickness as further detailed herein, with a top surface 130 and a bottom surface 135.

The hypotenuse 125 of the tool body 105 can be configured to have a hypotenuse slit 140 extending a selected depth 141 into the thickness of the tool body 105. A second slit 145 can also be formed along the top surface 130 into the tool body 105. In an exemplary embodiment, the hypotenuse slit 140, and the second slit 145 can be configured such that, were they to intersect they would form a right angle. The depth 146 of the second slit 145 can define the depth of the hypotenuse slit 140—the hypotenuse slit 140 can extend into the tool body 105 so that it nearly reaches the second slit 145, but so that the respective slits do not intersect.

The top surface 130 can be configured to be substantially parallel to the bottom surface 135. An indention 150 can be configured in the tool body 105 between to the second slit 145, and the right corner. The indention 150 can comprise a channel configured to hold a work piece. In certain embodiments, a series of marks 155 can be provided in the channel. The marks can be gradations for measuring length. Additional measurement markings 155 can be provided along the hypotenuse slit, the second slit, the opposite side 115, the adjacent side 120, or the hypotenuse 125.

Figure 2:
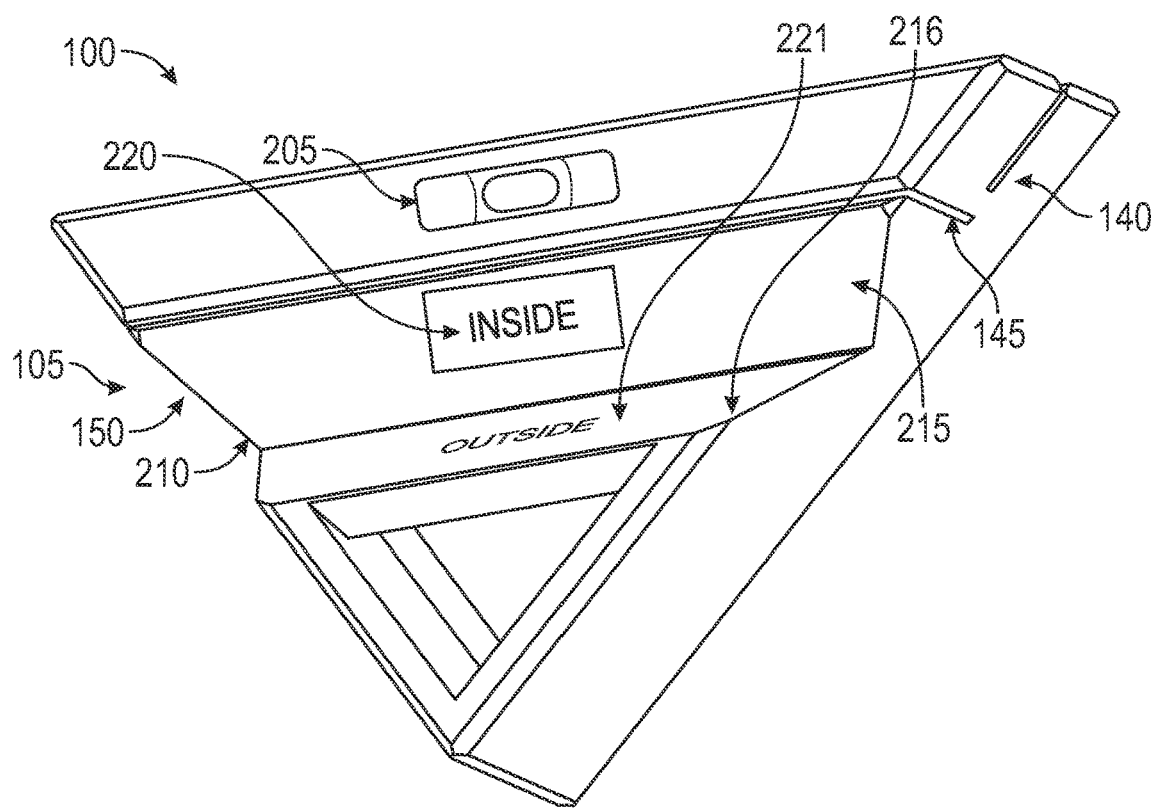
FIG. 2 depicts another view a squaring tool, in accordance with the disclosed embodiments.

FIG. 2 illustrates additional aspects of the squaring tool 100 in accordance with the disclosed embodiments. A level 205 can be configured in the top surface 130 and/or bottom surface 135.

As illustrated in FIG. 2. The top surface 130 can include indentation 150. The slope of the indention 150 can originate at or near the second slit 145. In certain embodiments, the indention 150 can extend in a "V" or "U" shape 210 between opposite side 115 and adjacent side 120, such that the indentation terminates at the same height as it originated (e.g., at the top surface 130). The V or U shape of the indention 210 is configured to accept unusually shaped media for cutting, even where the media has different respective widths and depths. The body 105 of the squaring tool can have a uniform thickness except along the indentation 150, where the thickness of the tool body 105 narrows.

Figure 3A:
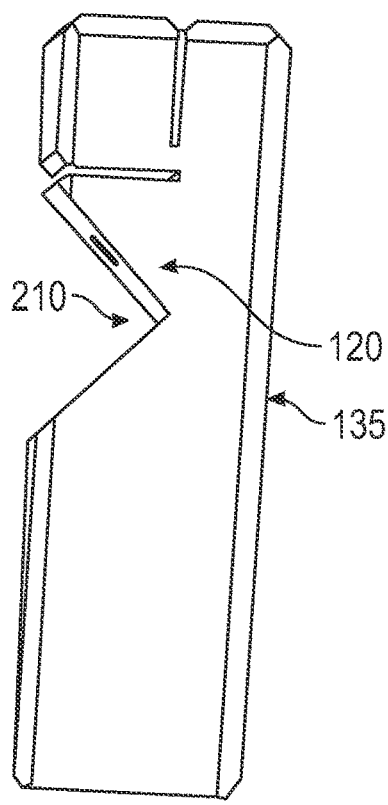
FIG. 3A depicts side view a squaring tool, in accordance with the disclosed embodiments.
Figure 3B:
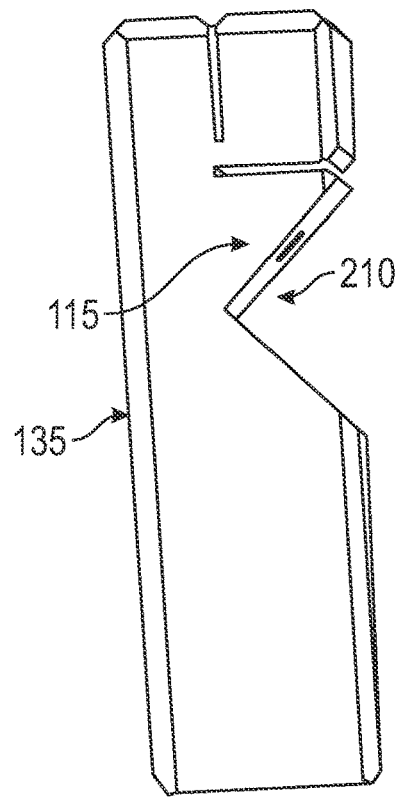
FIG. 3B depicts side view a squaring tool, in accordance with the disclosed embodiments.

FIGS. 3A and 3B illustrate elevation views of the squaring tool 105. FIG. 3A shows the opposite side 120 of the tool body 105 as well as the indention 150. FIG. 3B shows the adjacent side 115 of the tool body 105 as well as the indention 150.

The sloped surface 215 of the indentation 150 nearer to the hypotenuse 125 can be labeled with the term "inside" 220 as an instruction to the user. Likewise, the sloped surface 216 of the indentation 150 nearer to the right angle 110 of the tool body 105 can be labeled with the term "outside" 221 as an instruction to the user.

FIG. 4 illustrates additional aspects of the squaring tool 100 in accordance with the disclosed embodiments. The tool body 105 can include a pass through section 405 at or near the right angle 110. In certain embodiments, the pass through 405 can be a right triangle, with the right angle 410 of the triangle pass through 405 at or near the right angle 110 of the tool body 105. The adjacent side 415 of the pass through can be configured to be parallel with the adjacent 115 of the tool body 105 and the opposite side 420 of the pass through 405 can be configured to be parallel with the opposite side 120 of the tool body 105.

The tool body 105 can further be configured with a lip 425 that extends above the top surface 130 and/or below bottom surface 135 to allow the squaring tool 100 to be securely engaged to a mount, such as a tile saw lip.

Figure 4A:
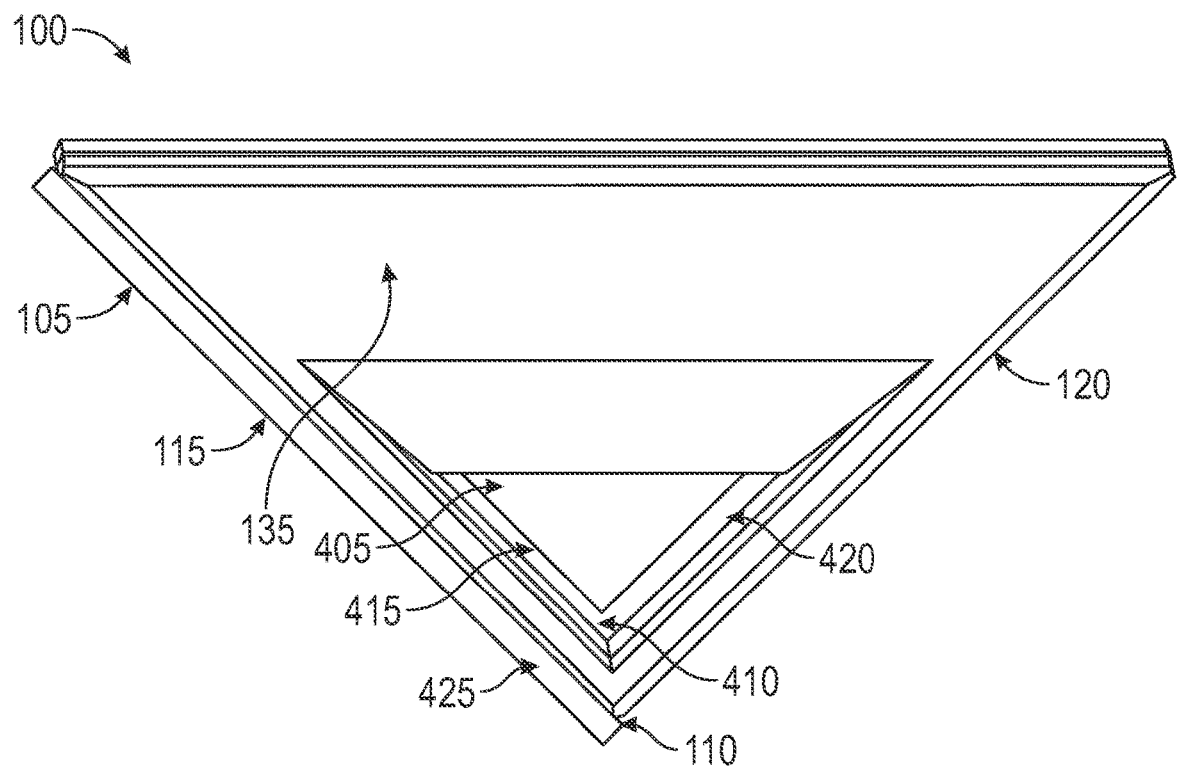
FIG. 4A depicts a rear view a squaring tool, in accordance with the disclosed embodiments.
Figure 4B:
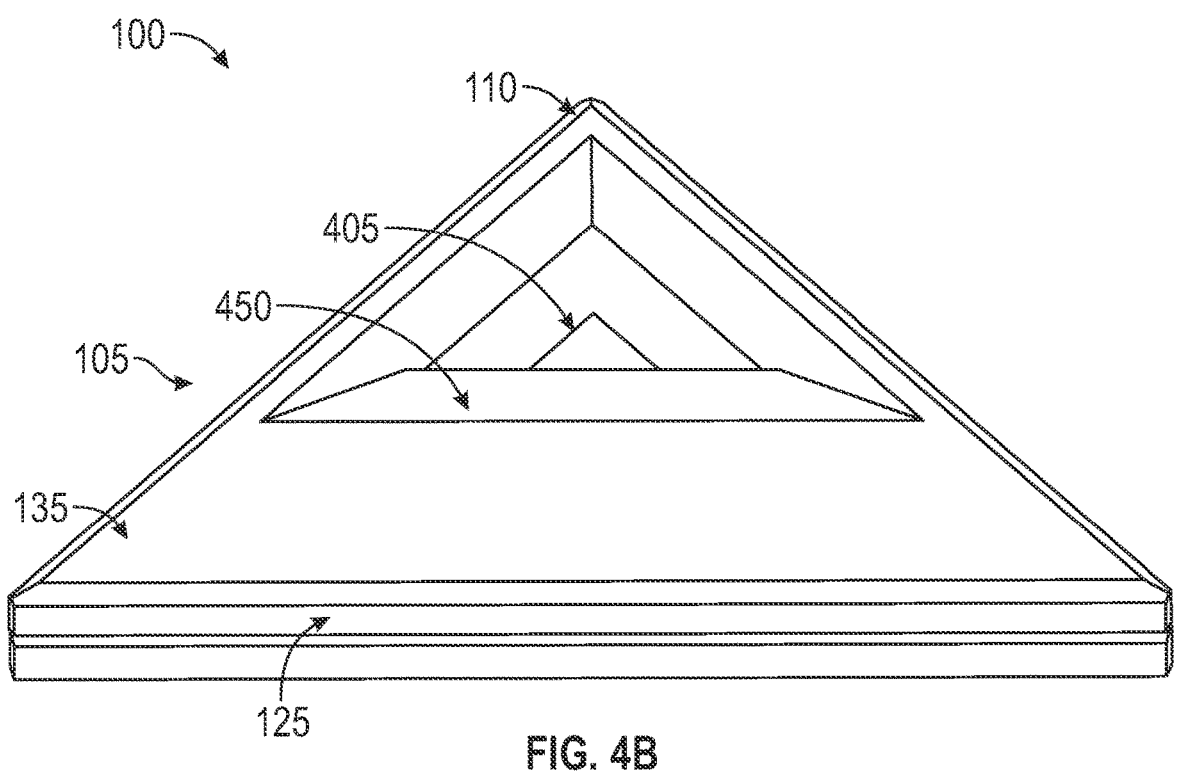
FIG. 4B depicts another rear view a squaring tool, in accordance with the disclosed embodiments.

As illustrated in FIG. 4A and FIG. 4B, the bottom surface 135 of the tool body can be flat. The bottom surface 135 can have a rectangular shaped sloping surface 450 originating nearer to the hypotenuse 125 of the tool body 105 and terminating at or near the hypotenuse 455 of the pass through 405. In certain embodiments, the rectangular shaped sloping surface 450 can be parallel with the top sloped surface 216 associated with the indentation 150 nearer to the right angle 110 of the tool body 105 labeled with the term "outside" 221. The profile of the rectangular shaped sloping surface 450 is illustrated in FIG. 4B.

Figure 4C:
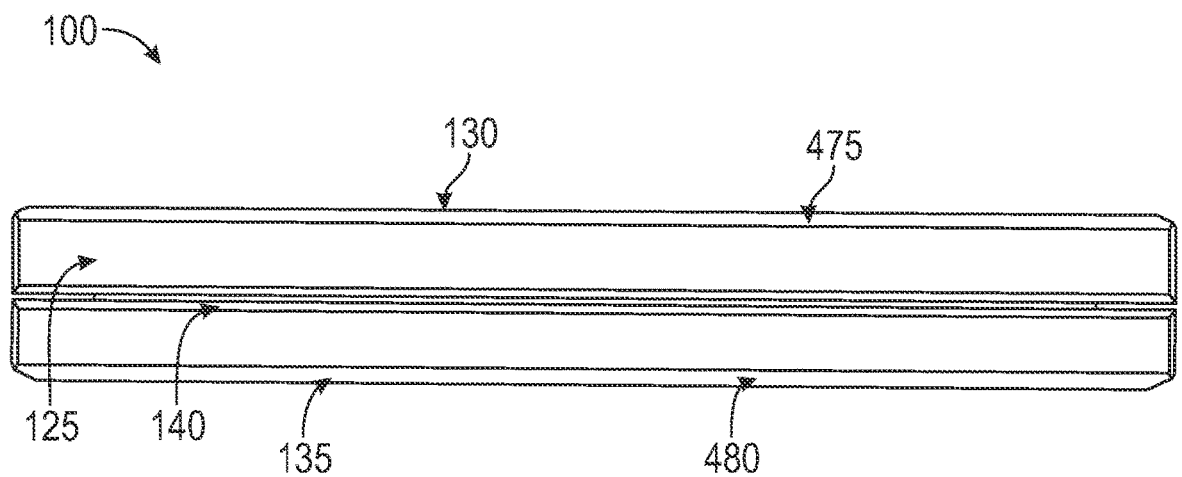
FIG. 4C depicts a bottom elevation view a squaring tool, in accordance with the disclosed embodiments.

FIG. 4C further illustrates that some or all of the edges 475 between the top surface 130, and one or more of the adjacent side 115, opposite side, or hypotenuse 125 can be beveled. Likewise, edges 480 between the bottom surface 135, and one or more of the adjacent side 115, opposite side, or hypotenuse 125 can be beveled. It should be appreciated that in FIG. 4C the beveling is only shown on the hypotenuse 125 but equivalent bevels can be provided on all edges between the respective sides of the tool body, as well as between the sides of tool body and the top or bottom surfaces.

Figure 5A:
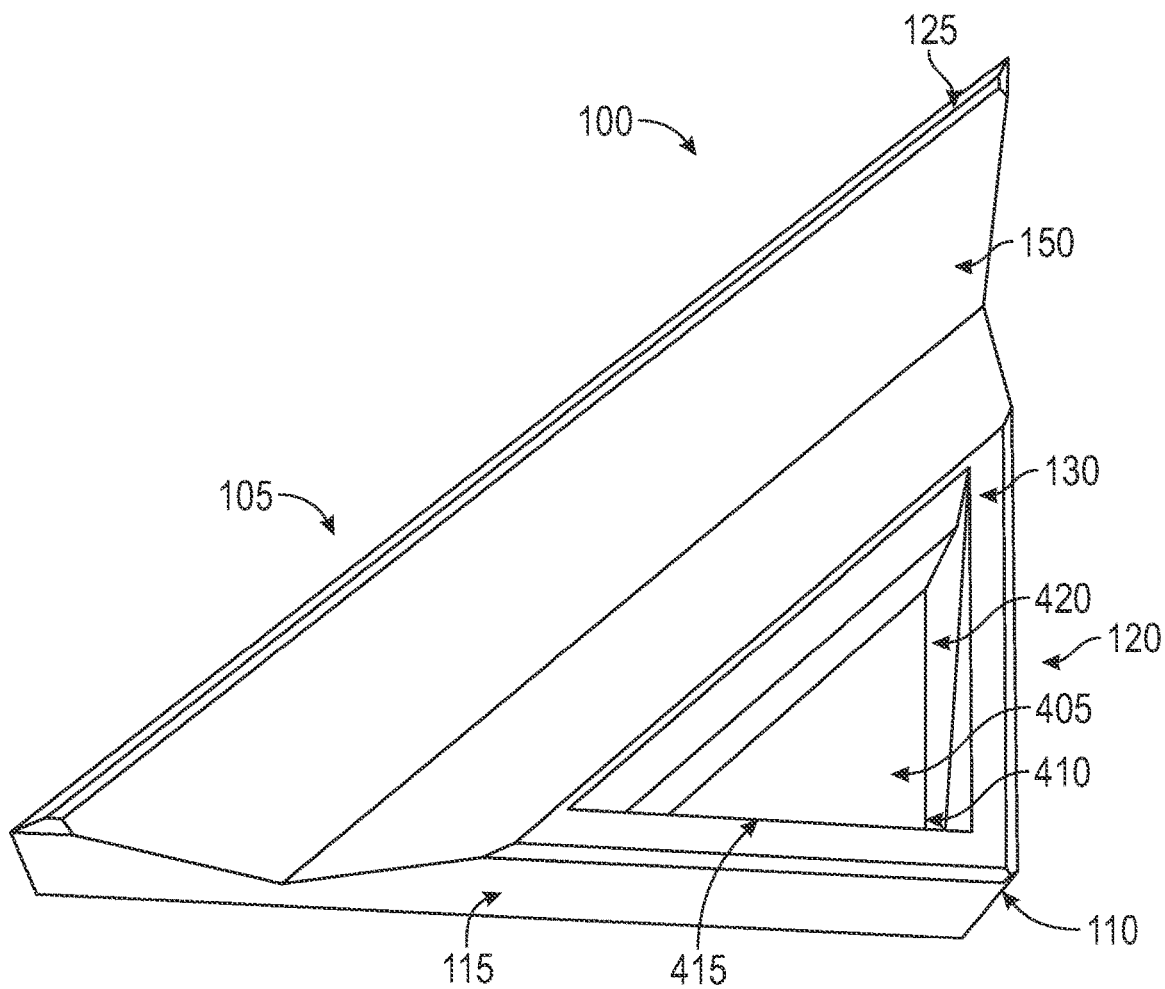
FIG. 5A depicts another embodiment of a squaring tool, in accordance with the disclosed embodiments.

FIG. 5A illustrates another embodiment of a squaring tool 100 without the hypotenuse slit or second slit in accordance with the disclosed embodiments. Aspects of the squaring tool 100 can mirror those illustrated in FIGS. 1-4, except that the tool body does not include the hypotenuse slit or second slit. The squaring tool 100 can generally comprises a body 105 configured as a right triangle, where right corner 110 of the triangle body 105 is a perfect 90 degrees. The squaring tool 100 thus includes a tool body 105 with an opposite side 115, adjacent side 120, and a hypotenuse side 125. The tool body 105 can be configured to have a desired thickness as further detailed herein, with a top surface 130 and a bottom surface 135.

The top surface 130 can be configured to be substantially parallel to the bottom surface 135. An indention 150 can be configured in the tool body 105. The indention 150 can comprise a channel configured to hold a work piece. The slope of the indention 150 can originate at or near the hypotenuse side 125. In certain embodiments, the indention 150 can extend in a "V" or "U" shape 210 between opposite side 115 and adjacent side 120, such that the indentation terminates at the same height as it originated (e.g., at the top surface 130). The body 105 of the squaring tool can have a uniform thickness except along the indentation 150, where the thickness of the tool body 105 narrows.

Figure 5B:
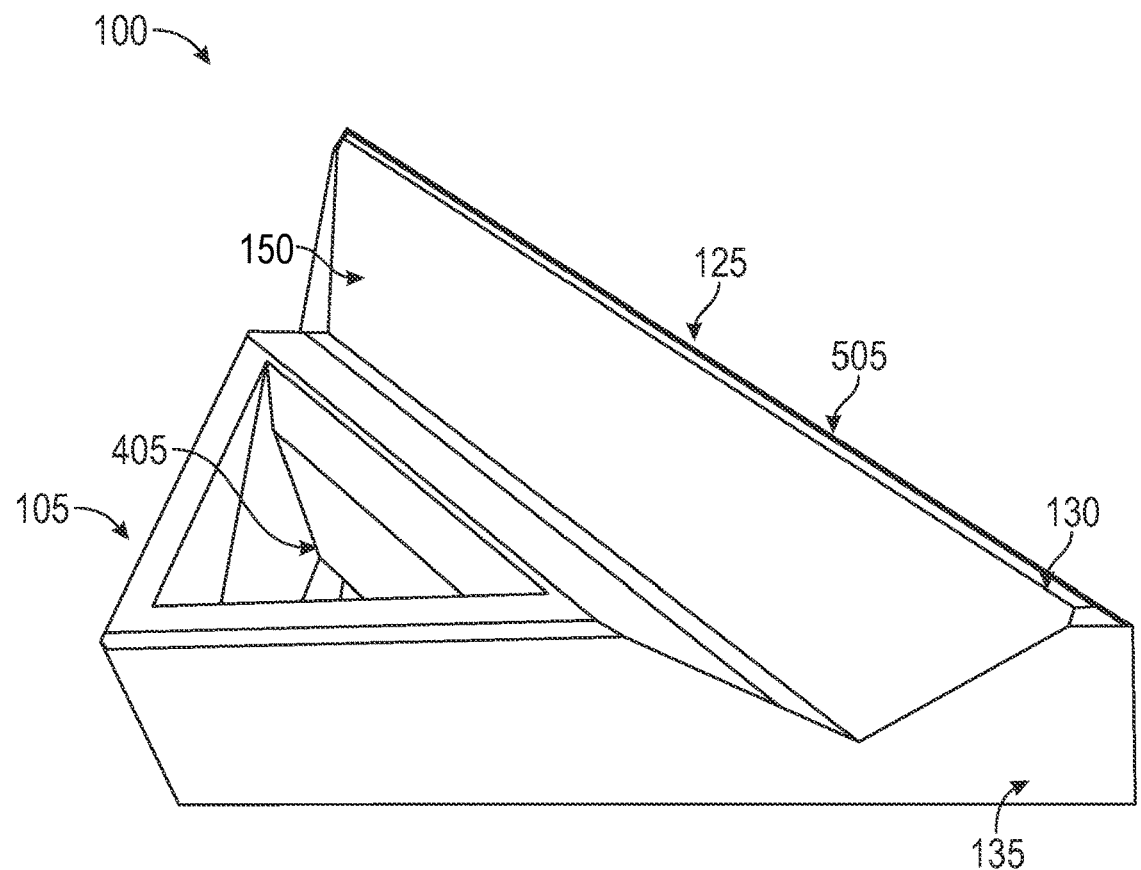
FIG. 5B depicts a perspective view of the squaring tool, in accordance with the disclosed embodiments.

FIG. 5B illustrates additional aspects of the squaring tool 100 in accordance with the disclosed embodiments. The tool body 105 can include a pass through section 405 at or near the right angle 110. In certain embodiments, the pass through 405 can be a right triangle, with the right angle 410 of the triangle pass through 405 at or near the right angle 110 of the tool body 105. The adjacent side 415 of the pass through can be configured to be parallel with the adjacent 115 of the tool body 105 and the opposite side 420 of the pass through 405 can be configured to be parallel with the opposite side 120 of the tool body 105.

Some or all of the edges 475 between the top surface 130, and one or more of the adjacent side 115 pr opposite side, can be chamfered. Likewise, edges 480 between the bottom surface 135, and one or more of the adjacent side 115, opposite side, or hypotenuse 125 can be chambered. In addition, the edge 505 between the top surface 130 and hypotenuse side 125 can be beveled.

Figure 6A:
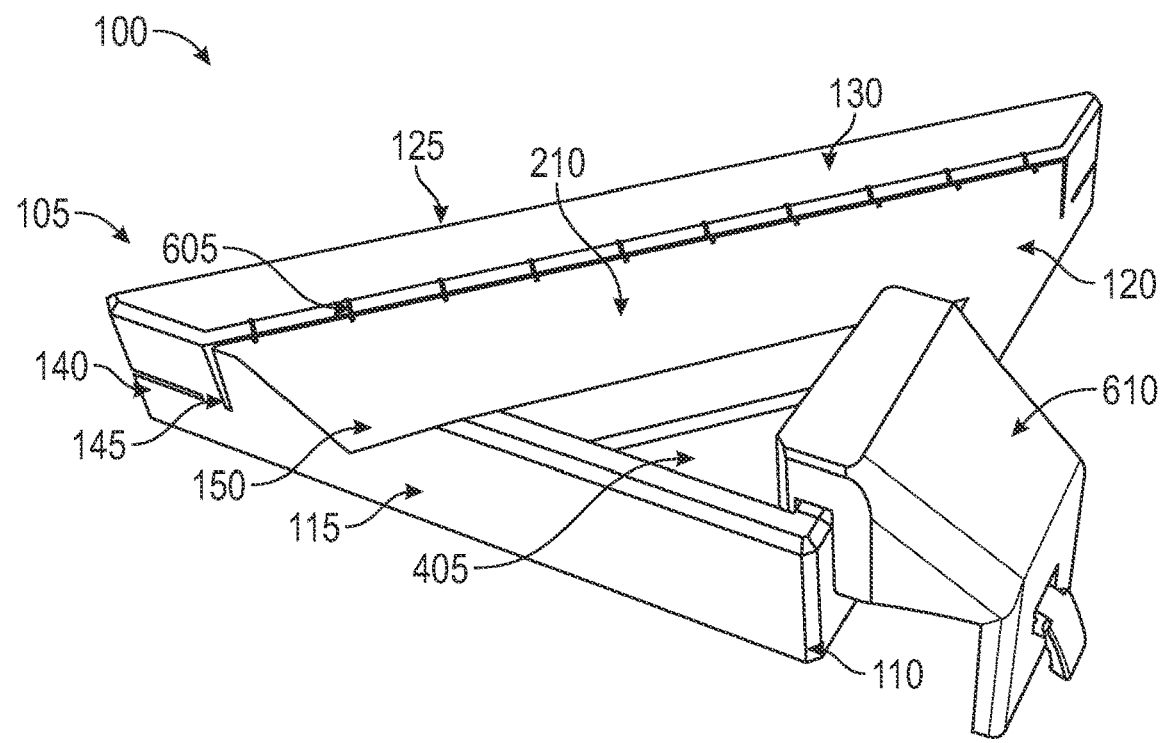
FIG. 6A depicts a squaring tool system, in accordance with the disclosed embodiments.

FIG. 6A illustrates another embodiment of a squaring tool 100 in accordance with the disclosed embodiments. The squaring tool 100 comprises a body 105 configured as a right triangle, where right corner 110 of the triangle body 105 is a perfect 90 degrees. The squaring tool 100 thus includes a tool body 105 with an opposite side 115, adjacent side 120, and a hypotenuse side 125. The tool body 105 can be configured to have a desired thickness as further detailed herein, with a top surface 130 and a bottom surface 135.

The hypotenuse 125 of the tool body 105 can be configured to have a hypotenuse slit 140 extending a selected depth 141 into the thickness of the tool body 105. A second slit 145 can also be formed along the top surface 130 into the tool body 105. In an exemplary embodiment, the hypotenuse slit 140, and the second slit 145 can be configured such that, were they to intersect they would form a right angle. The depth 146 of the second slit 145 can define the depth of the hypotenuse slit 140—the hypotenuse slit 140 can extend into the tool body 105 so that it nearly reaches the second slit 145, but so that the respective slits do not intersect.

The second slit 145 can be configured with a series of perpendicular slits 605. The series of perpendicular slits 605 can be equally spaced along the span of the second slit 145. The series of perpendicular slits 605 can be set at selected spacing for measurement purposes. The series of perpendicular slits 605 can further comprise aligned slits, or staggard slits, in each wall formed by the second slit 145 in the tool body 105.

Figure 6B:
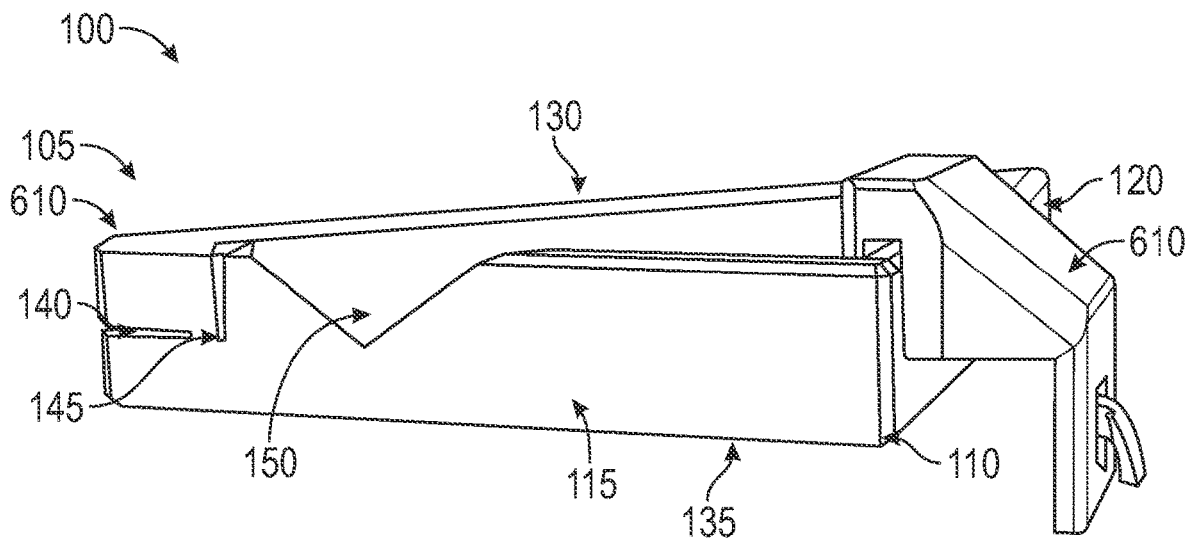
FIG. 6B depicts an elevation view of the squaring tool system, in accordance with the disclosed embodiments.

FIG. 6B provides an elevation view showing the top surface 130 can be configured to be substantially parallel to the bottom surface 135. An indention 150 can be configured in the tool body 105 between to the second slit 145, and the right corner. The indention 150 can comprise a channel configured to hold a work piece.

The slope of the indention 150 can originate at or near the second slit 145. In certain embodiments, the indention 150 can extend in a "V" or "U" shape 210 between opposite side 115 and adjacent side 120, such that the indentation terminates at the same height as it originated (e.g., at the top surface 130). The body 105 of the squaring tool can have a uniform thickness except along the indentation 150, where the thickness of the tool body 105 narrows.

The tool body 105 can include a pass through section 405 at or near the right angle 110. In certain embodiments, the pass through 405 can be a right triangle, with the right angle 410 of the triangle pass through 405 at or near the right angle 110 of the tool body 105. The adjacent side 415 of the pass through can be configured to be parallel with the adjacent 115 of the tool body 105 and the opposite side 420 of the pass through 405 can be configured to be parallel with the opposite side 120 of the tool body 105.

Figure 6C:
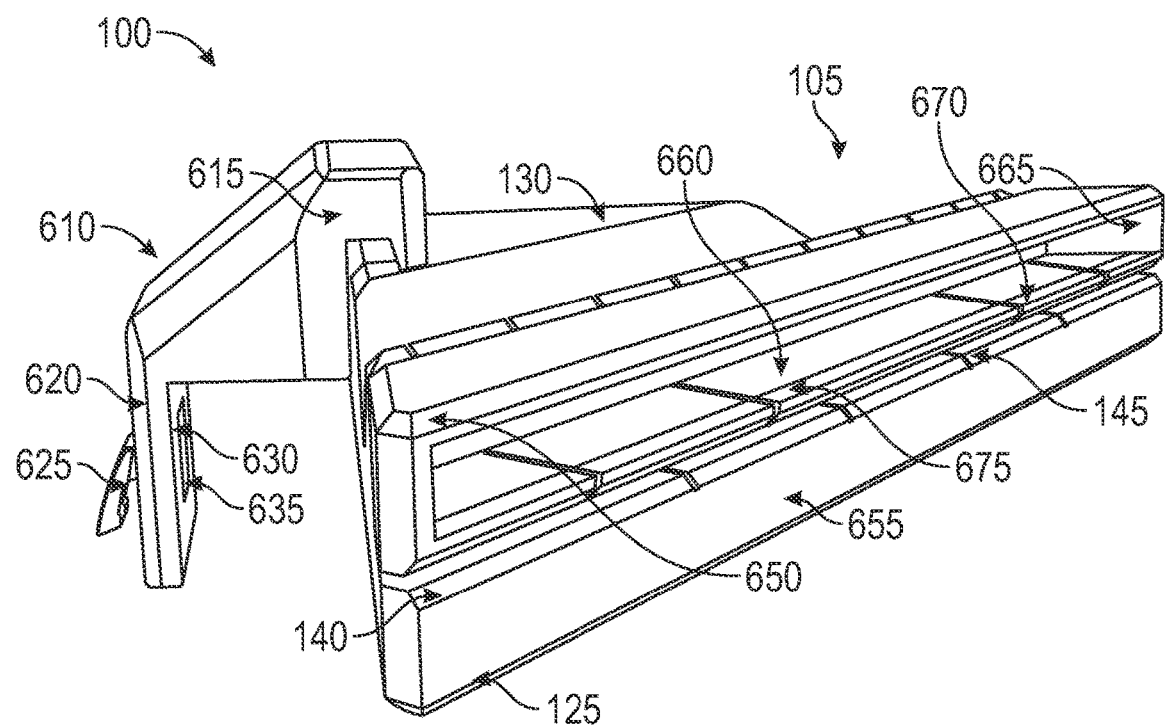
FIG. 6C depicts another view of the squaring tool system, in accordance with the disclosed embodiments.
Figure 6D:
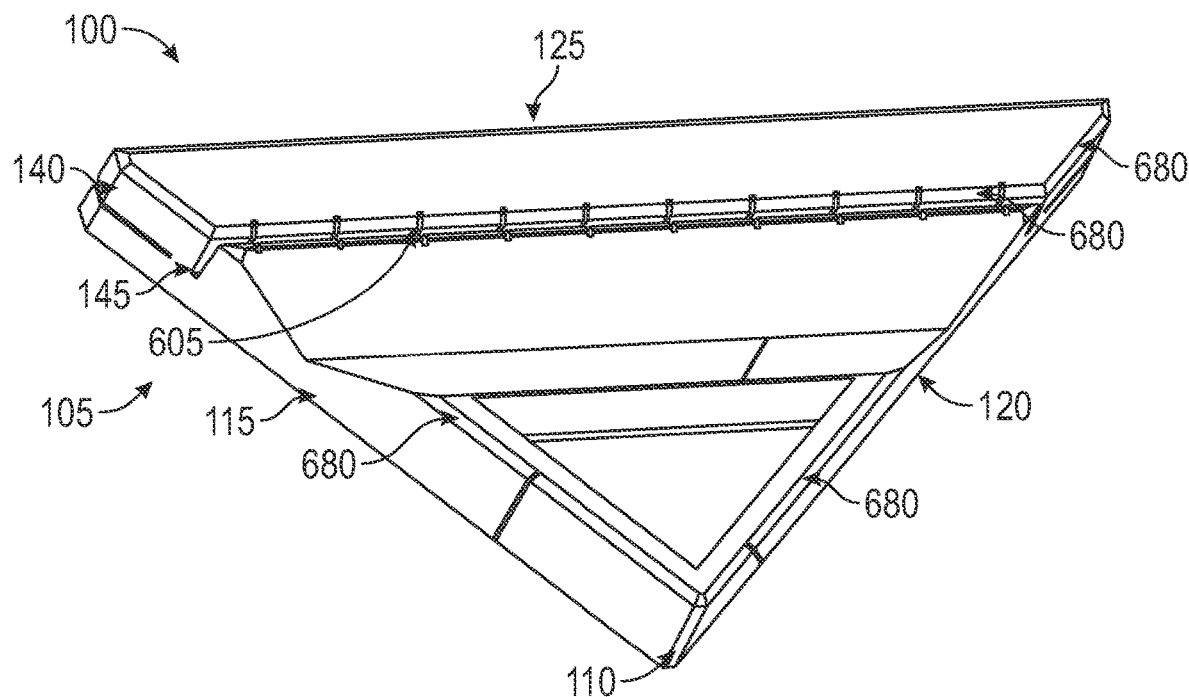
FIG. 6D depicts a top view of the squaring tool system, in accordance with the disclosed embodiments.
Figure 6E:
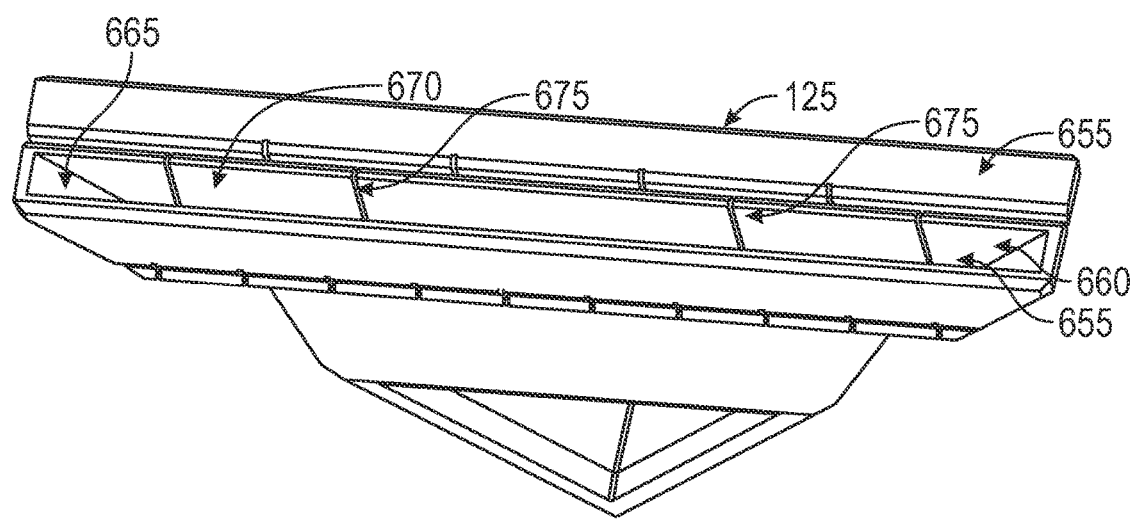
FIG. 6E depicts a perspective view of the squaring tool system, in accordance with the disclosed embodiments.

FIG. 6C, FIG. 6D, and FIG. 6E illustrates additional aspects of the squaring tool 100 in accordance with the disclosed embodiments. The hypotenuse side 125 of the tool body 105 can be divided into a first section 650 and second section 655. The second section 655 can be a solid surface. The first section 650 can comprise a chamber 660 formed inside the tool body 105. The chamber opening 665 can be along the first section 650 of the hypotenuse 125. The series of hypotenuse slits 675 can extend through the side wall 670 of the chamber 660.

The pass through 405 can be configured with a vertical adjacent side 415 and a vertical opposite side 420 configured to engage a clamp 610. The clamp 610 can include a jaw 615 configured to engage the tool body 105, wherein one side of the jaw 615 engages the side of the tool body 105 and the other side of the jaw 615 engages the side of the pass through 405. The clamp 610 further includes a clamp arm 620 configured to have a spaced relation to the tool body 105. The clamp arm 620 further includes a locking lever 625 configured such that when the lever 625 is operated a pressure pad 630 extends through window 635 to create pressure and friction in order to hold the clamp 610 in place.

Various parameters of the squaring tool 100 can be selected to allow the squaring tool 100 to interface with a cutting device. In an exemplary embodiment, this can include a wet saw. For example, in certain embodiments, the parameters of the squaring tool 100 including the thickness of the squaring tool 100, the grade and/or slope of the various surfaces, and the slits, can be selected to interface with a wet saw and a work piece to aid in the completion of cuts for quarter round pieces of tile. For example, the squaring tool 100 can be configured to have angles that can be used as a template to guide and cut quarter round on a tile saw. In other examples, the work piece can comprise trim, accent tile, profiles, Schluter trim, or other such non-flat material are also difficult to hold steady. The disclosed embodiments are configured to sit above the saw fence allowing clearance for the metal trim, tiles etc. making for an easier, more accurate cuts.

The squaring tool 100 can also be configured to be printed as extrudable polymer or plastic via 3D printing. In other embodiments, the tool can be made of aluminum and can be fabricated via casting. It should be noted, material selections can be based on the need for high strength to weight ratio and rigidity. The tool body 105 can be produced in any color including bright green, orange, or other such high contrast colors to aid in alignment and accuracy. The squaring tool 100 can be configured in a number of relative sizes, including a smaller version where the V groove 210 is used with quarter round and tile trims. This can be configured to be smaller and more compact.

Figure 7:
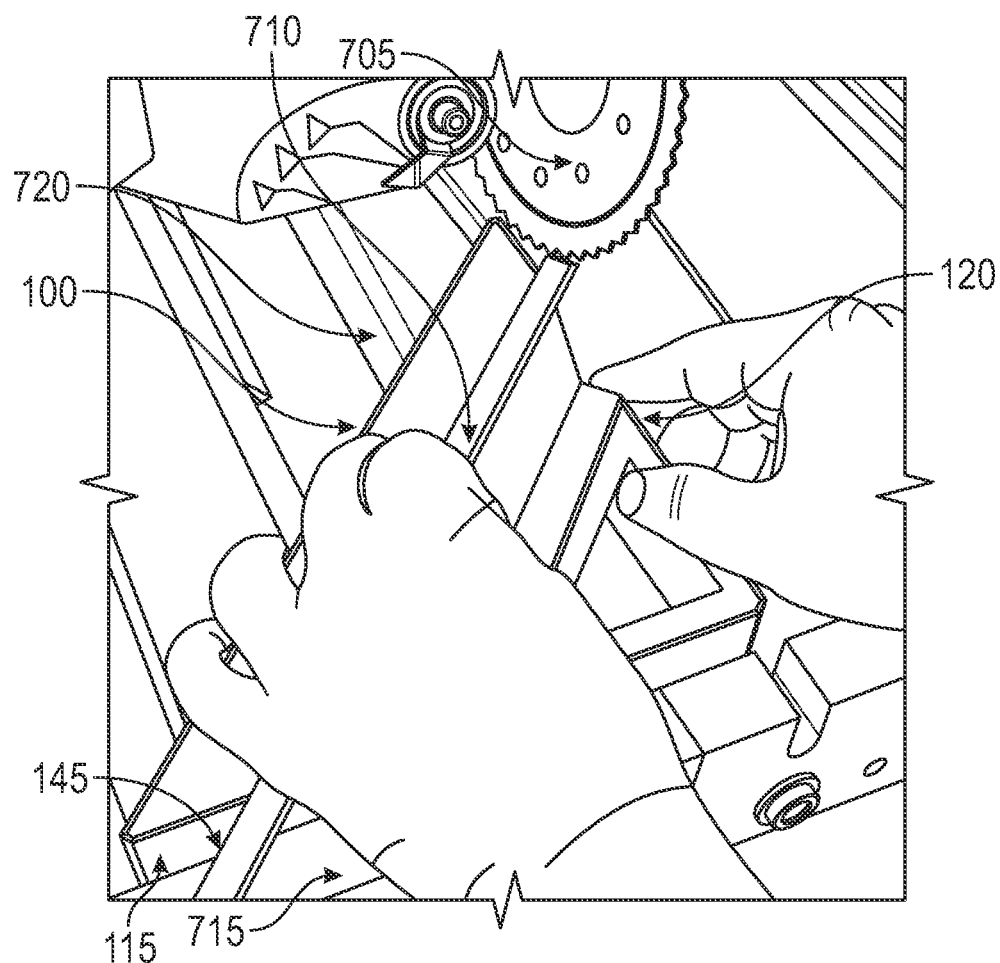
FIG. 7 depicts a squaring tool used with a saw to cut a work piece, in accordance with the disclosed embodiments.

FIG. 7 illustrates an exemplary embodiment of the squaring tool 100 in association with a tile saw 705 and a work piece 710, in accordance with the disclosed embodiments. In this exemplary embodiment, the work piece 710 can comprise an angled trim piece, but it should be appreciated that other work pieces can similarly be used with the squaring tool 100. The angles created by the squaring tool 100. As illustrated, one side of the work piece 710 can be inserted in the second slit 145. The adjacent side 115 of the tool body 105 can be braced against the tile saw 705 platform rim or fence 715. The opposite edge 120 can be aligned with grooves 720 in the tile saw and/or the saw blade, to serve as a guide for the saw.

In this exemplary embodiment, the shape of the tool body 105 is selected to be a 45 45 90 triangle, meaning the angles of the opposite and adjacent angles are 45 degrees. As a result, the second slit 145 holds the work piece 710 such that the saw 705 cuts the end of the work piece 710 to have a 45 degree angle. This useful for creating connections between two work pieces at 45 degrees. The tool can be flipped, and the processes repeated for a matching angle, such that the two angled pieces form a clean 90 degree joint. The squaring tool 100 thus facilitates accurate and simple cuts with a tile saw. It should be appreciated that in other embodiments the tool body can be selected to be any style of right triangle (e.g., a 30 60 90 triangle), which will facilitate cuts at other angles.

Figure 8:
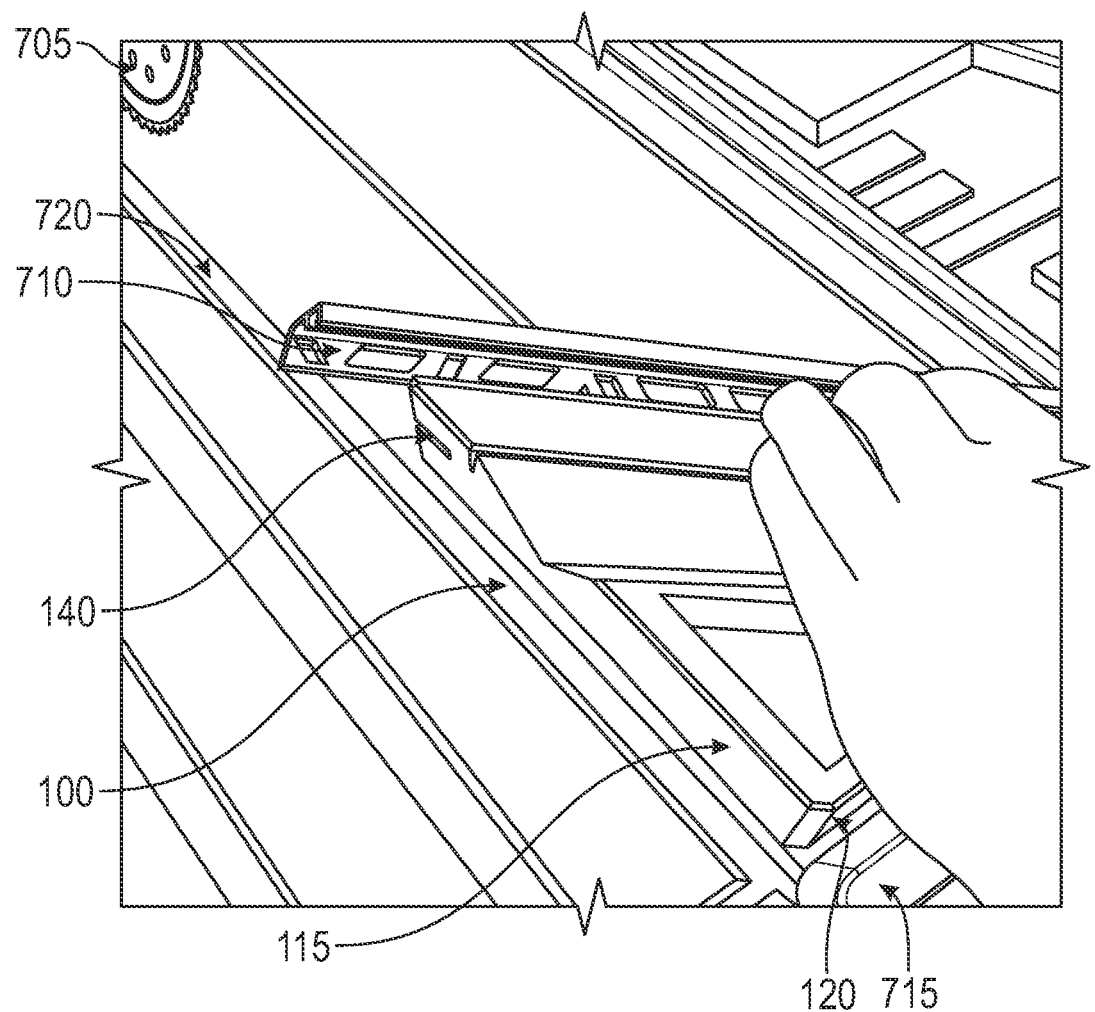
FIG. 8 depicts a squaring tool used with a saw to cut a work piece, in accordance with the disclosed embodiments.

FIG. 8 similarly illustrates an exemplary embodiment of the squaring tool 100 in association with a tile saw 705 and a work piece 710, in accordance with the disclosed embodiments. In this exemplary embodiment, the work piece 710 can comprise a trim piece, but it should be appreciated that other work pieces can similarly be used with the squaring tool 100. As illustrated, one side of the work piece 710 can be inserted in the hypotenuse slit 140. The opposite side 120 of the tool body 105 can be braced against the tile saw 705 platform rim or fence 715. The adjacent edge 115 can be aligned with grooves 720 in the tile saw and/or the saw blade, to serve as a guide for the saw.

Figure 9:
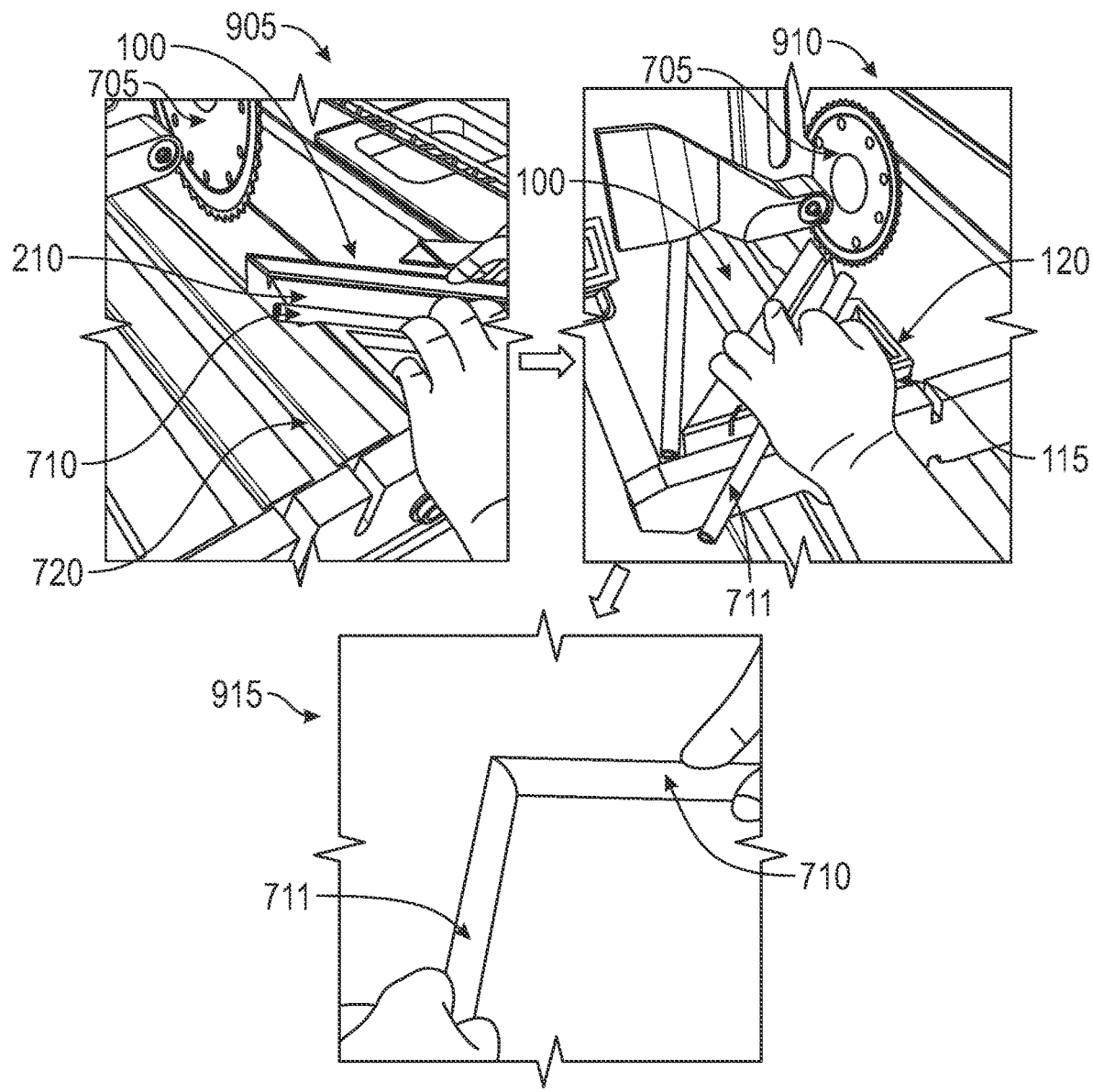
FIG. 9 depict use of a squaring tool to cut work pieces in order to form a joint between the work pieces, in accordance with the disclosed embodiments.

FIG. 9 illustrate aspects of the disclosed embodiments, including the execution of cuts to form a clean angle joint in a work piece 710 comprising a tubular trim material. As illustrated at 905, the tubular trim material 710 can be seated in the V shaped indention 210 of the squaring tool 100. The adjacent side 115 of the squaring tool 100 can be secured against the rim or fence 715 of the saw 705. The opposite edge 120 can be aligned with grooves 720 in the saw 705 platform, to serve as a guide for the saw. The V shaped indention 210 cradles the work piece 710, as the first cut is. Next, at 910 the squaring tool 100 is rotated, and another work piece 711 is inserted in the V shaped indention 210, so that another cut can be executed. The two cut trim pieces can then be joined forming a perfect 45 degree joint as illustrated at 915.

Creating clean cuts for angled joints in unusually shaped work pieces such as trim, quarter round tile, tubing, etc. is very difficult and time consuming. The disclosed embodiments, provide a simple and effective means for securing oddly shaped work pieces as they are cut, to ensure clean cuts and joints.

Figure 10:
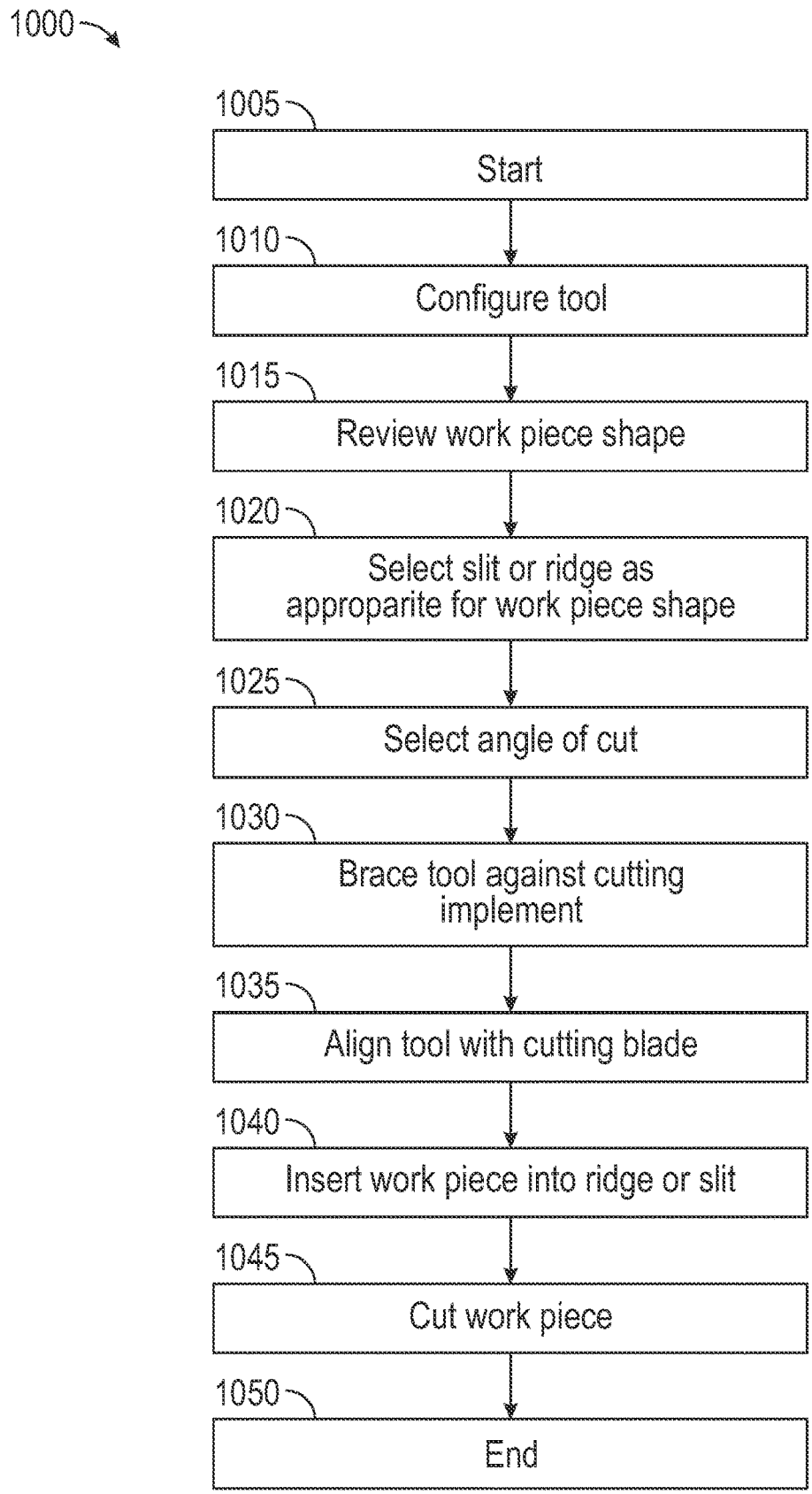
FIG. 10 depicts steps associated with a method for cutting work pieces, in accordance with the disclosed embodiments.

FIG. 10 illustrates a method 1000 for cutting certain media in accordance with the disclosed embodiments. The method starts at 1005.

At step 1010, the squaring tool 100 can be configured. In certain embodiment, this can include selecting the squaring tool 100 with the desired angles for the cutting application, this includes but is not limited to the tool body 105 being 45 45 90 triangle, a 30 60 90 triangle, or the like. The squaring tool 100 can be configured, as described herein, to include various ridges and slits for holding the work piece. The squaring tool 100 can also be selected to have a desired size and thickness for the application.

Next at step 1015, the shape of the work piece can be evaluated to determine if it is appropriate for engagement in one of the slits or ridges. At step 1020 one of the slits or indentions can be selected for holding the work piece. The angle of the cut can also be determined based on the application of the work piece at step 1025.

At step 1030, the squaring tool 100 can be braced against the tile saw (or other such cutting device). In certain embodiments, the adjacent side 115 of tool body 105 can butt up against the rim or fence of the saw. The opposite side 120 of the tool body 105 can be aligned with guides in the cutting tool or with the cutting blade itself at step 1035.

Once these steps are complete, the squaring tool 100 is ready to accept the work piece. The material can be seated in the V shaped ridge or one of the slits as appropriate for the material shape at step 1040. The operator can hold the work piece in place and execute the desired cut at step 1045, at which point the cutting is complete and the method ends at step 1050.

Based on the foregoing, it can be appreciated that a number of embodiments, preferred and alternative, are disclosed herein. For example, in an embodiment a tool comprises a tool body, the tool body configured to have an adjacent side, an opposite side, and a hypotenuse, a hypotenuse slit formed in the tool body, a second slit formed in the tool body, and an indentation in the tool body.

In an embodiment, the indentation comprises a downward sloping surface on a top surface of the tool body and an adjacent upward sloping surface on the top surface of the tool body.

In an embodiment, the tool further comprises a rectangular sloping surface in a bottom surface of the tool body. In an embodiment, the tool further comprises a pass through in the tool body. In an embodiment, the tool body comprises a right triangle.

In an embodiment, the hypotenuse slit further comprises a slit along the hypotenuse of the tool body between the opposite side of the tool body and the adjacent side of the tool body. In an embodiment, the second slit further comprises a slit along the top surface of the tool body between the opposite side of the tool body and the adjacent side of the tool body. In an embodiment, the hypotenuse slit is in a perpendicular plane to that of the second slit. In an embodiment, the tool further comprises the second slit is parallel to the indentation in the tool body.

In an embodiment, the tool body is configured to engage a work piece to be cut with a wet saw.

In another embodiment a system comprises a tool body, the tool body comprising a right triangle configured to have an adjacent side, an opposite side, and a hypotenuse, a hypotenuse slit formed in the hypotenuse of the tool body, a second slit formed in the top surface of the tool body, and an indentation in the tool body.

In an embodiment, the indentation comprises a downward sloping surface on a top surface of the tool body and an adjacent upward sloping surface on the top surface of the tool body.

In an embodiment, the system further comprises a pass through in the tool body. In an embodiment, the system further comprises a chamber formed in a first section of the hypotenuse.

In an embodiment, the hypotenuse slit further comprises a slit along the hypotenuse of the tool body between the opposite side of the tool body and the adjacent side of the tool body, and at least one perpendicular slit formed in a first section, or a second section separated by the hypotenuse slit. In an embodiment, the second slit further comprises a slit along the top surface of the tool body between the opposite side of the tool body and the adjacent side of the tool body and at least one perpendicular slit formed in the tool body along the second slit.

In an embodiment, the tool body is configured to engage a work piece to be cut with a saw. In an embodiment, the system further comprises a clamp configured to engage to the tool body and the saw.

In an embodiment a tool comprises a tool body, the tool body comprising a right triangle configured to have an adjacent side, an opposite side, and a hypotenuse, a hypotenuse slit formed in the tool body, a second slit formed in the tool body, an indentation in the tool body, and a pass through in the tool body. In an embodiment, the system further comprises a plurality of markings configured at equal intervals along the second slit.

It will be appreciated that variations of the above-disclosed and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the following claims.

What is claimed is:

1. A tool comprising:
   a tool body, the tool body comprising a right triangle having an adjacent side, an opposite side, and a hypotenuse side;
   a hypotenuse slit perpendicularly through the hypotenuse of the tool body;
   a second slit through the tool body parallel to the hypotenuse side, the second slit perpendicular to the hypotenuse slit; and
   an indentation parallel to the hypotenuse of the tool body, the indentation extends between the opposite side and the adjacent side.

2. The tool of claim 1 wherein the indentation comprises:
   a downward sloping surface defined by a top surface of the tool body;
   and an adjacent upward sloping surface defined by the top surface of the tool body.

3. The tool of claim 1 further comprising: a rectangular sloping surface in a bottom surface of the tool body.

4. The tool of claim 1 further comprising: a pass through in the tool body.

5. The tool of claim 1 wherein the tool body comprises a hypotenuse slit is in a plane perpendicular to a plane of the second slit of the right triangle.

6. The tool of claim 1 wherein the hypotenuse slit extends through each respective opposing end of the hypotenuse of the tool body.

7. The tool of claim 1 wherein the second slit further comprises: a slit along the top surface of the tool body between the opposite side of the tool body and the adjacent side of the tool body.

8. The tool of claim 1 wherein the hypotenuse slit is in a perpendicular plane to that of the second slit, wherein said tool body comprises a flat bottom surface, said flat bottom surface parallel to said hypotenuse slit.

9. The tool of claim 8, wherein the second slit is parallel to the indentation in the tool body.

10. The tool of claim 1 wherein the tool body is configured to engage a work piece to be cut with a wet saw.

11. A system comprising:
    a tool body, the tool body comprising a right triangle configured to have an adjacent side, an opposite side, and a hypotenuse side;
    a hypotenuse slit perpendicularly through the hypotenuse side of the tool body;
    a second slit through the tool body parallel to the hypotenuse, the second slit perpendicular to the hypotenuse slit; and
    an indentation parallel to the hypotenuse of the tool body, the indentation extends between the opposite side and the adjacent side.

12. The system of claim 11 wherein the indentation comprises: a downward sloping surface on the top surface of the tool body; and
    an adjacent upward sloping surface on the top surface of the tool body.

13. The system of claim 11 further comprising: a pass through in the tool body.

14. The system of claim 11 wherein the hypotenuse side of the tool body is divided into a longitude first section and a longitudinal second section, the longitudinal second section forms a solid surface and the longitudinal first section comprises a chamber with a series of transverse hypotenuse slits.

15. The system of claim 14 wherein the hypotenuse slit further comprise: at least one perpendicular slit formed in a first section, or a second section separated by the hypotenuse slit.

16. The system of claim 15, wherein the second slit further comprises:
    at least one perpendicular slit formed in the tool body along the second slit.

17. The system of claim 11 wherein the tool body is configured to engage a work piece to be cut with a saw.

18. The system of claim 17 further comprising a clamp configured to engage the saw and a pass through which forms a right triangle adjacent to the adjacent side and the opposite side, an adjacent side of the pass through parallel with the adjacent side of the tool body and an opposite side of the pass through parallel with the opposite side of the tool body.

19. A tool comprising:
    a tool body, the tool body comprising a right triangle configured to have an adjacent side, an opposite side, and a hypotenuse;
    a hypotenuse slit centered and perpendicularly through the hypotenuse of the tool body:
    a second slit through the tool body parallel to the hypotenuse, the second slit perpendicular to the hypotenuse slit;
    an indentation in the tool body parallel to the hypotenuse, wherein the indentation comprises a V shape to accept media for cutting; and
    a pass through in the tool body, the pass through forms a right triangle adjacent to the adjacent side and the opposite side, an adjacent side of the pass through parallel with the adjacent side of the tool body and an opposite side of the pass through parallel with the opposite side of the tool body.

20. The tool of claim 19 further comprising:
a plurality of markings configured at equal intervals along the second slit.

21. The tool as recited in claim 1, further comprising a level parallel to the hypotenuse side of the tool.

22. The tool as recited in claim 1, further comprising an "INSIDE" label on the sloped surface 215 of the indentation 150 nearer to the hypotenuse 125 and an "OUTSIDE" label on the sloped surface 216 of the indentation 150 nearer to the right angle 110 of the tool body 105.

23. The tool as recited in claim 22, wherein the indentation forms a "V" shape.

24. The tool as recited in claim 22, further comprising a pass through in the tool body, the pass through forms a right triangle adjacent to the adjacent side and the opposite side, an adjacent side of the pass through parallel with the adjacent side of the tool body and an opposite side of the pass through parallel with the opposite side of the tool body.

25. The tool as recited in claim 9, wherein a depth of the hypotenuse slit extends into the tool body so as to not intersect with the second slit.

26. The tool as recited in claim 25, further comprising a series of perpendicular slits in the second slit.

27. The tool as recited in claim 26, wherein the series of perpendicular slits are spaced along the span of the second slit.

28. The tool as recited in claim 26, wherein the series of perpendicular slits are equally spaced along the span of the second slit.

29. The tool as recited in claim 26, wherein the series of perpendicular slits are staggard along the second slit.

* * * * *